Feb. 5, 1935.  B. O. WALTERS  1,989,837
VEHICLE CUSHIONING DRIVE MEANS
Filed April 12, 1934   3 Sheets-Sheet 2
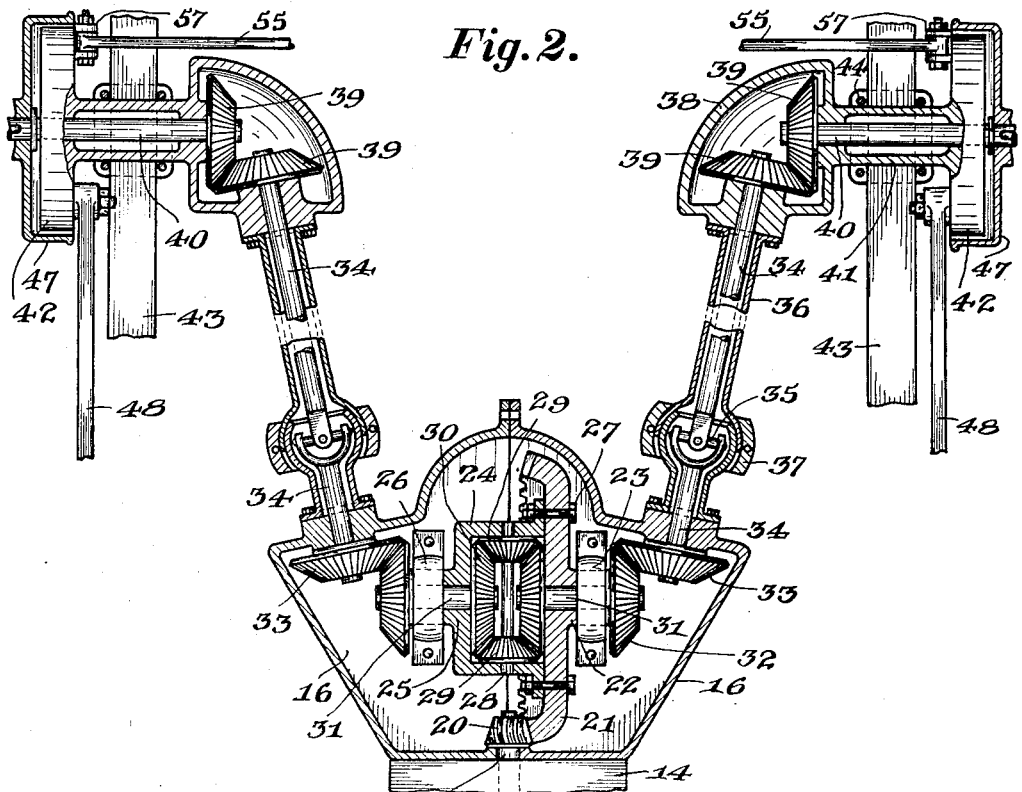
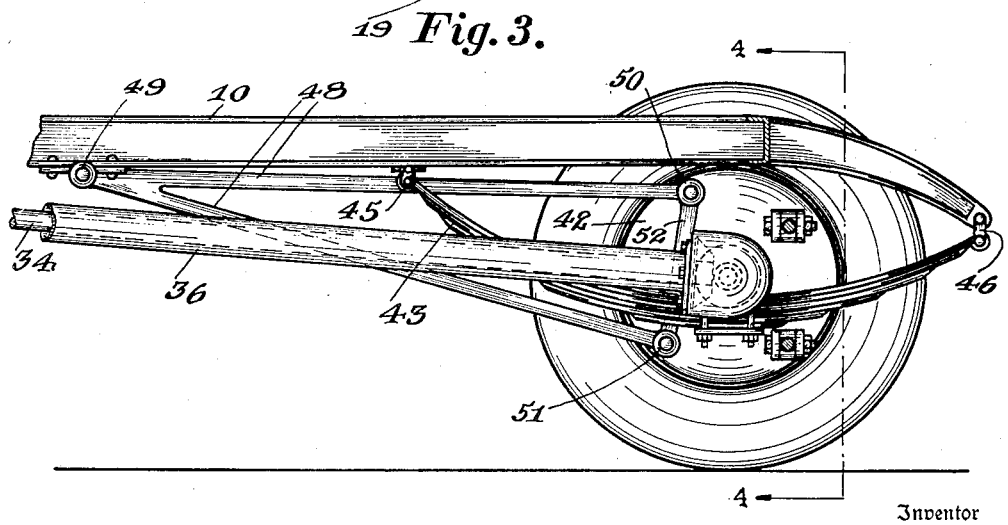
Inventor
B.O.Walters

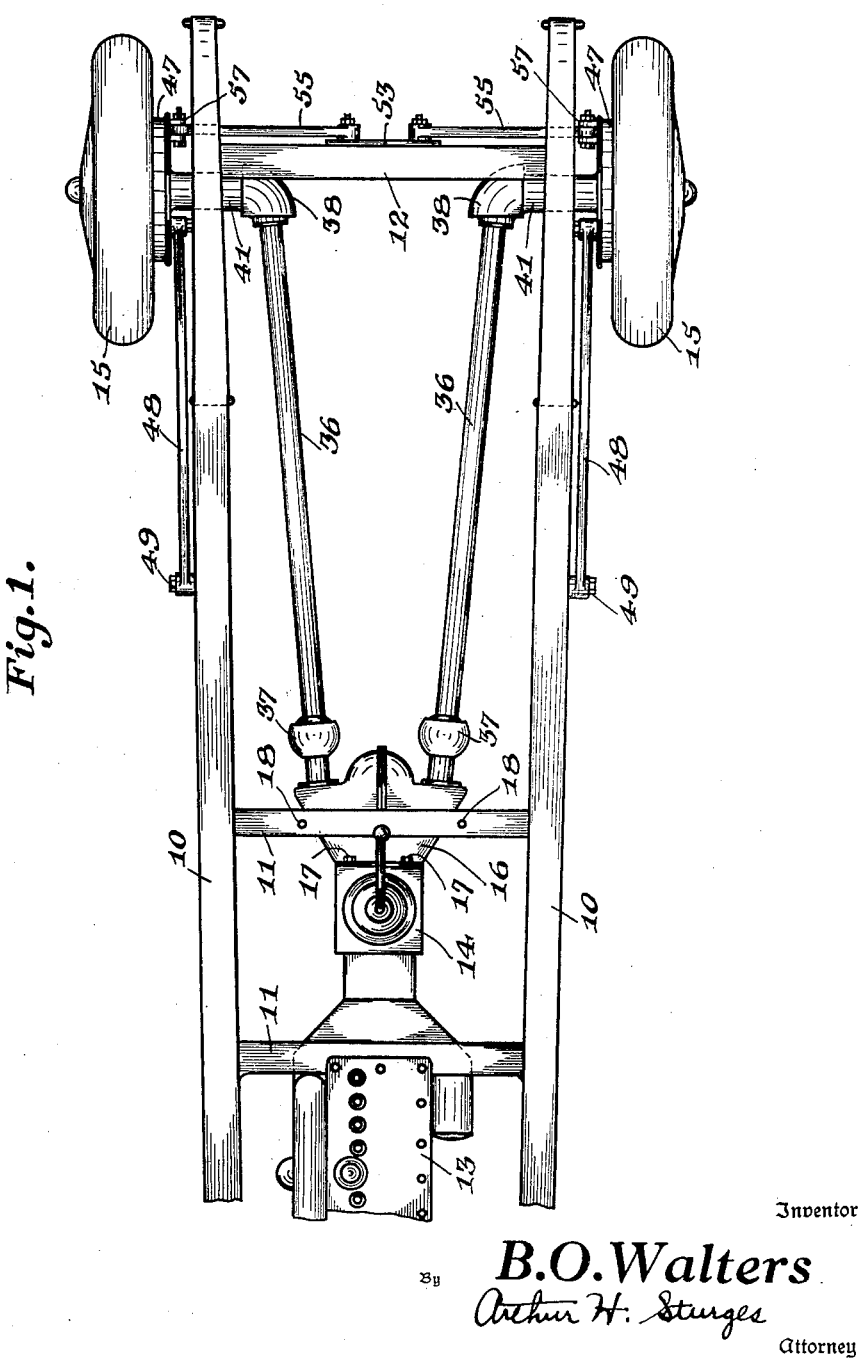

Patented Feb. 5, 1935

1,989,837

UNITED STATES PATENT OFFICE 1,989,837

VEHICLE CUSHIONING DRIVE MEANS

Ben O. Walters, Omaha, Nebr., assignor of one-fourth to Cecil J. Healey and one-fourth to Florence E. Healey, both of Omaha, Nebr.

Application April 12, 1934, Serial No. 720,327

5 Claims. (Cl. 180—73)

The present invention relates to motor vehicles, and more particularly to an improved cushioning drive means, or a drive connection to the traction wheels and a mounting for the wheels permitting the independent rise and fall of the wheels during driving.

An object of the present invention is to provide a drive means for the rear wheels of a vehicle wherein the power may at all times be applied to both of the drive wheels and wherein the drive wheels are independently and yieldably maintained in contact with the ground to insure uniform and constant traction, and so that the rear wheels while being driven are capable of independent vertical movement for cushioning the vehicle against shocks and jars incident to road travelling and obstructions encountered in the roadway.

The invention has for a further object to provide an improved rear wheel mounting wherein the usual semi-elliptic springs may be employed, wherein the wheels are maintained in their true relatively parallel positions at different elevations of the wheels, and wherein the wheels may be independently driven from a differential housing supported on the frame of the vehicle.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of the frame of a motor vehicle equipped with a wheel driving and mounting device according to the present invention, the forward end of the frame being broken away.

Figure 2 is a horizontal sectional view taken lengthwise through the driving mechanism.

Figure 3 is a transverse section taken through the rear portion of the vehicle frame substantially on the line 3—3 of Figure 4.

Figure 4:
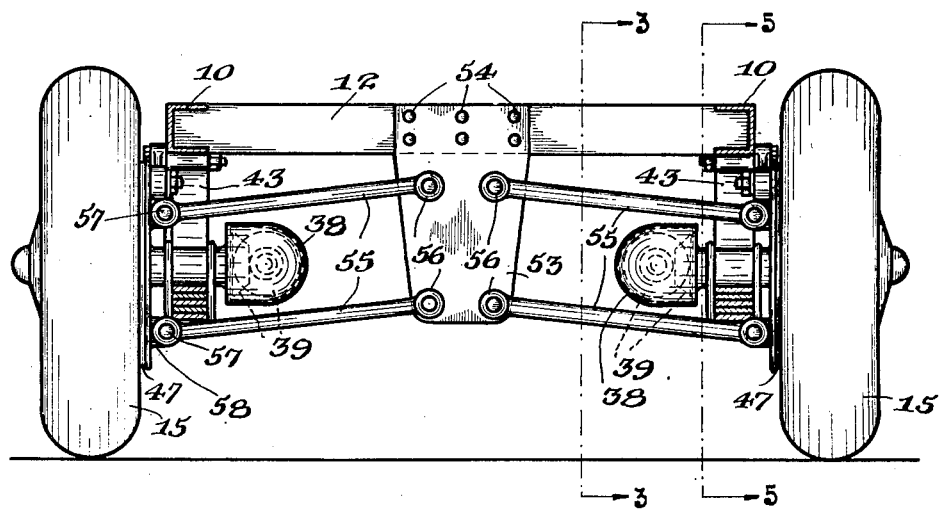
Figure 4 is a rear elevation of the vehicle frame and wheel mounting.

Referring now to the drawings, and first to Figure 1, a vehicle frame is provided with side rails 10 which are reinforced by intermediate cross braces 11 and by a rear cross brace 12. An engine 13, or other suitable source of power, is mounted in the forward part of the frame, and is connected to a change speed transmission device 14 through which power from the engine is transmitted in the desired ratio to the rear wheels 15 of the vehicle.

According to the present invention, the change speed transmission device 14 is directly coupled at its rear end to a differential gear housing 16 by bolts 17, or the like, and the latter may be secured to an adjacent cross brace 11 by bolts 18, as shown.

With particular reference now to Figure 2, the transmission device 14 is provided with a driven or propeller shaft 19, which terminates at its rear end in the differential casing 16 and carries a drive pinion 20 which meshes with a crown gear 21. The crown gear 21 has a trunnion or journal portion 22 extending from the outer side of the crown gear 21 and mounted in a bearing 23 disposed within the differential casing 16. Mounted upon the inner side of the crown gear 21 is a spider or drum 24 which is provided with a trunnion or journal 25 coaxial with the trunnion 22 and which is mounted in a second bearing 26 disposed in the opposite side of the transmission housing 16. The spider or hub 24 is removably secured to the crown gear 21 by bolts 27, or the like, to facilitate separation and assembling of the elements of the differential gear mechanism. The spider 24 is provided with a cross shaft 28 which is disposed with its axis in a plane parallel to the plane of the crown gear 21, and the cross shaft 28 carries a pair of pinion idlers 29 which are arranged against the inner sides of the peripheral portion of the spider or drum 24 and are held at all times in mesh with a pair of opposed bevelled gears 30 which are secured to short shafts 31 coaxially disposed in the trunnions 22 and 25 and extending in opposite directions through the trunnions and beyond the bearings 23 and 26. Bevelled pinions 32 are fixed upon the outer ends of the short shafts 31 and mesh with correspondingly bevelled gear wheels 33 secured upon the forward ends of the driving shafts 34.

From Figures 1 and 2, it will be noted that the differential gear casing 16 is substantially Y-shaped and that the lateral branches thereof extend toward the opposite rear wheels 15. The branches contain the bevelled gears 33 and the driving shafts 34 extend rearwardly through the casing 16 therefrom. The shafts 34 and the parts connecting the same to the wheels 15 are similar at opposite sides of the frame. Each shaft 34 is provided, preferably adjacent the differential gear casing 16, with a universal joint 35 and is enclosed within a tubular housing 36 suitably flared and overlapped about the universal joint 35 and with a retaining collar 37 at the flared and overlapped joint of the housing. The shaft 34 is of suitable length and at its rear end has bearing in one branch of an elbow casing 38 in which are positioned a pair of intermeshing bevelled gear wheels 39. One of the gear wheels 39 is fixed upon the rear end of the shaft 34, while the other gear wheel 39 is fixed upon a stub axle 40 which has bearing in a fixed axle housing 41 which is preferably a part of the elbow casing 38 and which at its outer end is flared or enlarged to provide a disc or plate 42.

The axle housing 41 extends across the usual leaf of a semi-elliptic spring 43 and is secured thereto by axle clips 44 or the like. The forward end of the spring 43 is connected by a shackle 45 to the adjacent side rail 10 of the frame and the rear end of the spring 43 may be connected to the rear horn of the side rail 10 by a shackle 46.

Each wheel 15 is provided with a brake drum 47 which encloses the disc or plate 42 and may be provided with the usual brake mechanism. In order to hold the axle housing 41 and its parts in position on the spring 43, a branched reach rod 48 is pivotally mounted at 49 to the adjacent side rail 10 of the frame at a point forwardly of the adjacent wheel 15 and the branches of the reach rod 48 extend rearwardly to pins 50 and 51 which project inwardly from the plate 42, and for the purpose of reinforcement, a link or bar 52 may be connected across the pins 50 and 51.

Figure 5:
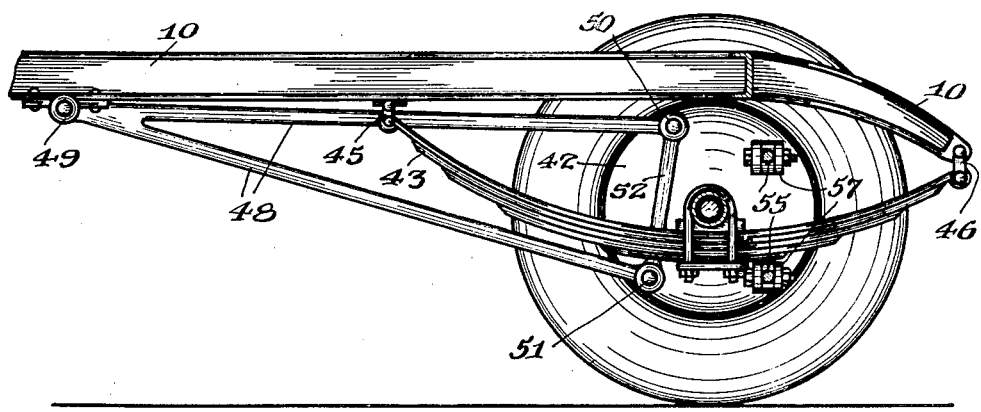
Figure 5 is a fragmentary longitudinal section taken on the line 5—5 of Figure 4, showing the wheel mounting on the spring.

As shown to advantage in Figures 3, 4 and 5, the rear cross brace 12 of the frame is provided with a downwardly extending plate 53 secured rigidly to the brace 12 by bolts or rivets 54. Pairs of parallel links 55 are secured at their inner ends in vertically spaced relation by pivot pins 56 to the plate 53 with the pivot pins disposed in pairs in vertical alignment. The parallel links 55 extend outwardly toward the wheels 15 and are pivotally mounted by pins 57 to pairs of vertically aligned ears 58, which extend inwardly from the adjacent plates 42.

In operation the propeller shaft 19 drives through the differential gearing in the casing 16 and turns the driving shafts 34. From the shafts 34, the power is delivered to the stub axles 40 and the latter are keyed or otherwise suitably secured to the wheels 15 in the ordinary manner for driving the wheels. When one of the wheels is raised or elevated, incident to obstructions or undulations in the road surface, the corresponding spring 43 is flexed to collapse the spring with the result that the wheel 15 is raised and the stub axle 40 with its housing 41 and adjacent parts are also raised, the movement being independent of the driving connections for the opposite wheel 15. The parallel links 55 maintain the wheel 15 in true vertical alignment at all times and the reach rod 48 holds the wheel and its stub axle 40 from shifting forwardly or rearwardly on the spring 43, so that no strain will be imposed upon the driving shaft 34 or its enclosed and connected parts.

The rear wheels are thus independently free to rise and fall during the travel of the vehicle and the power may at all times be simultaneously and equally transmitted to the wheels 15 and the latter maintained in constant tractive engagement with the ground. Incidentally, the frame and the vehicle body mounted thereon, are not subject to the violent shocks and jars as the rise and fall of the wheels 15 are independent of each other and the support upon the frame is solely through the springs 43.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. In motor vehicle transmission, a frame, a power shaft on the frame, a differential gear mechanism having a housing mounted on the frame and provided with driving shafts diverging rearwardly from the housing, a pair of springs mounted beneath the frame, an elbow casing having an outwardly extending axle housing for each spring and connected thereto, a stub axle in each axle housing and connected to the adjacent driving shaft in the adjacent elbow casing, a traction wheel connected to the outer end of each stub axle, reach rods disposed between the sides of the frame and the adjacent axle housings, and parallel rod structures arranged between the opposite axle housings and the frame to hold the traction wheels in parallel relation at all times.

2. In motor vehicle transmission, a frame, a pair of springs mounted beneath the rear end of the frame, an axle housing secured across each spring, a stub shaft mounted in each axle housing, a traction wheel mounted on the outer end of each stub shaft, each axle housing having upon its outer end an enlarged disc provided at its rear portion with vertically aligned pairs of ears and provided at its forward portion with vertically spaced pins, independent drive means connected to the inner ends of said stub shafts for independently driving the traction wheels, a reach rod mounted upon each side of the frame and connected to said pins of the disc, a plate secured to the rear end of the frame and extending downwardly therefrom between the traction wheels, and vertically spaced apart pairs of parallel rods pivotally mounted at their inner ends to said plate and at their outer ends to said ears of the discs.

3. In a motor vehicle, a frame, a spring disposed beneath one side of the frame, an axle housing secured across said spring, a stub shaft journalled in the axle housing, a traction wheel secured upon the outer end of the stub shaft, said axle housing having an enlarged disc upon its outer end about the stub shaft and having an elbow casing on its inner end, bracing means pivotally attached to said disc and the frame for preventing substantial longitudinal and transverse movement of the wheel with respect to the frame, a driving shaft extending at its rear end into said elbow casing and drivingly connected to said stub shaft, and gear mechanism mounted on the frame and drivingly connected to the forward end of the driving shaft.

4. In a motor vehicle, a frame, springs mounted in the opposite sides of the frame, a wheel carrying means independently mounted across each of said springs and comprising a stub shaft, wheels carried by said stub shafts, a power transmitting mechanism on the frame, driving shafts rearwardly diverging one to each wheel from the power transmitting mechanism, means for driving the stub shafts contained in the wheel carrying means and connected to the driving shafts, bracing means between the wheel carrying means and the frame to prevent substantial longitudinal movement of the wheels with respect to the frame, and further bracing means between the wheel carrying means and the frame to prevent transverse movement.

5. In a motor vehicle, a frame, springs independently mounted on opposite sides of the frame, axle housings independently mounted one on each spring, a stub axle in each of the housings, a wheel mounted on each stub axle, bracing means connected between the frame and the axle housings to prevent substantial longitudinal movement and additional bracing means connected between the frame and the axle housings to prevent substantial transverse movement of the axle housings with respect to the frame, a differential gear mechanism mounted on the frame forwardly of the wheels, and driving shafts diverging rearwardly from the differential gear mechanism to each of the housings, said driving shafts being drivingly connected to the stub axles.

BEN O. WALTERS.